(12) United States Patent
Dyle Kim

(10) Patent No.: US 10,241,387 B1
(45) Date of Patent: Mar. 26, 2019

(54) RETRACTABLE SCREEN SYSTEM FOR A VEHICLE INTERIOR

(71) Applicant: GM GLOBAL TECHNOLOGY OPERATIONS LLC, Detroit, MI (US)

(72) Inventor: Taryn Dyle Kim, Detroit, MI (US)

( * ) Notice: Subject to any disclaimer, the term of this patent is extended or adjusted under 35 U.S.C. 154(b) by 0 days.

(21) Appl. No.: 15/864,076

(22) Filed: Jan. 8, 2018

(51) Int. Cl.
  *G03B 21/58* (2014.01)
  *B60R 11/00* (2006.01)
  *B60R 11/02* (2006.01)

(52) U.S. Cl.
  CPC .......... *G03B 21/58* (2013.01); *B60R 11/0229* (2013.01); *B60R 2011/0015* (2013.01); *B60R 2011/0071* (2013.01); *B60R 2011/0082* (2013.01); *B60R 2011/0084* (2013.01); *B60R 2011/0276* (2013.01)

(58) Field of Classification Search
  CPC ..................................................... G03B 21/58
  USPC ............................................. 359/461; 353/13
  See application file for complete search history.

(56) References Cited

U.S. PATENT DOCUMENTS

| | | | | |
|---|---|---|---|---|
| 5,982,537 A * | 11/1999 | Koizumi | .................. | H04R 5/02 359/444 |
| 7,036,936 B2 * | 5/2006 | Hattori | ................ | B60R 11/0235 353/13 |
| 7,821,709 B2 * | 10/2010 | Anderson | .............. | G03B 21/60 353/79 |
| 2006/0187421 A1 * | 8/2006 | Hattori | ..................... | H04N 5/74 353/69 |
| 2009/0268164 A1 * | 10/2009 | Bowden | ................. | B60K 35/00 353/13 |
| 2010/0244505 A1 * | 9/2010 | Demick | .............. | B60R 11/0235 297/188.04 |
| 2013/0077063 A1 * | 3/2013 | Hirata | .................... | G02B 17/08 353/98 |
| 2016/0347255 A1 * | 12/2016 | Fujii | ....................... | B60R 5/047 |

FOREIGN PATENT DOCUMENTS

GB            379781 A    *  9/1932  ............. G03B 21/58

* cited by examiner

*Primary Examiner* — Christopher E Mahoney

(57) ABSTRACT

One general aspect includes a retractable screen system for a vehicle interior, the system including: a retracting module mounted to the backside of the backrest of a vehicle operator seat via an attachment rail; an attachment bar mounted to the backside of the backrest of a vehicle passenger seat, one side of the attachment bar including a ridge; a flexible screen configured to deploy from the retracting module in a lateral direction and releasably attach to the attachment bar ridge via an attachment clip so as to establish a viewing surface adapted to display a projected video output of a projector, the projector installed in the vehicle interior; and where the attachment rail is configured to enable the retracting module to move in relation to a substantially vertical axis.

10 Claims, 5 Drawing Sheets

RETRACTABLE SCREEN SYSTEM FOR A
VEHICLE INTERIOR

INTRODUCTION

Current vehicles are limited in an ability to display video and multimedia sources. Many current vehicles use Liquid Crystal Displays (LCD) or some other form of flat-panel display to show video and other multimedia information. These displays are typically packaged in the back of seat headrests. In general, the mounting location of these displays limits the size of the physical display and makes it hard for a viewer to fully appreciate what is being displayed. It is therefore desirable to leverage a large display to allow vehicle occupant viewers to fully appreciate the content of what is being displayed.

SUMMARY

One general aspect includes a retractable screen system for a vehicle interior, the system including: a retracting module mounted on a first surface of the vehicle interior; a retaining device mounted on a second surface of the vehicle interior; and a flexible screen configured to deploy from the retracting module in a lateral direction and releasably attach to the retaining device so as to establish a viewing surface adapted to display a projected video output.

Implementations may include one or more of the following features. The retractable screen system where the retaining device is an attachment bar including a ridge. The retractable screen system where the flexible screen further includes an attachment clip adapted to releasably attach to a portion of the attachment bar ridge so as to releasably attach the flexible screen to the attachment bar. The retractable screen system where the retracting module is mounted to the first surface via an adjustment rail, the adjustment rail configured to enable the retracting module to move in relation to a substantially vertical axis. The retractable screen system where: the first surface of the vehicle interior is the backside of the backrest of a first vehicle seat; and the second surface of the vehicle interior is the backside of the backrest of a second vehicle seat. The retractable screen system where the flexible screen further includes a pull strap to facilitate deployment from the retracting module in the lateral direction.

One general aspect includes a retractable screen system for a vehicle interior, the system including: a retracting module mounted to the backside of the backrest of a vehicle operator seat via an attachment rail; an attachment bar mounted to the backside of the backrest of a vehicle passenger seat, one side of the attachment bar including a ridge; a flexible screen configured to deploy from the retracting module in a lateral direction and releasably attach to the attachment bar ridge via an attachment clip so as to establish a viewing surface adapted to display a projected video output of a projector, the projector installed in the vehicle interior; and where the attachment rail is configured to enable the retracting module to move in relation to a substantially vertical axis.

Implementations may include one or more of the following features. The retractable screen system where the projector is one of a laser-based projector, a DLP-based projector, and an LED-based projector. The retractable screen system where the flexible screen further includes a pull strap to facilitate deployment from the retracting module in the lateral direction.

One general aspect includes a method of installing a retractable screen system for a vehicle interior, the method including: mounting a retracting module to a first surface of the vehicle interior; mounting a retaining device to a second surface of the vehicle interior; allowing a flexible screen to deploy from the retracting module in a lateral direction. The method also includes allowing the flexible screen to releasably attach to the retaining device so as to establish a viewing surface adapted to display a projected video output.

Implementations may include one or more of the following features. The method where the retaining device is an attachment bar that includes a ridge. The method where the flexible screen further includes an attachment clip adapted to releasably attach to a portion of the attachment bar ridge so as to releasably attach the flexible screen to the attachment bar. The method further including where the retracting module is mounted to the first surface via an adjustment rail. The method may also include allowing the retracting module to move in relation to a substantially vertical axis via the adjustment rail. The method where: the first surface of the vehicle interior is the backside of the backrest of a first vehicle seat; and the second surface of the vehicle interior is the backside of the backrest of a second vehicle seat. The method where the flexible screen further includes a pull strap to facilitate deployment from the retracting module in the lateral direction.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
FIG. 1 is a perspective view showing an exemplary retractable screen system in use.
Figure 2:
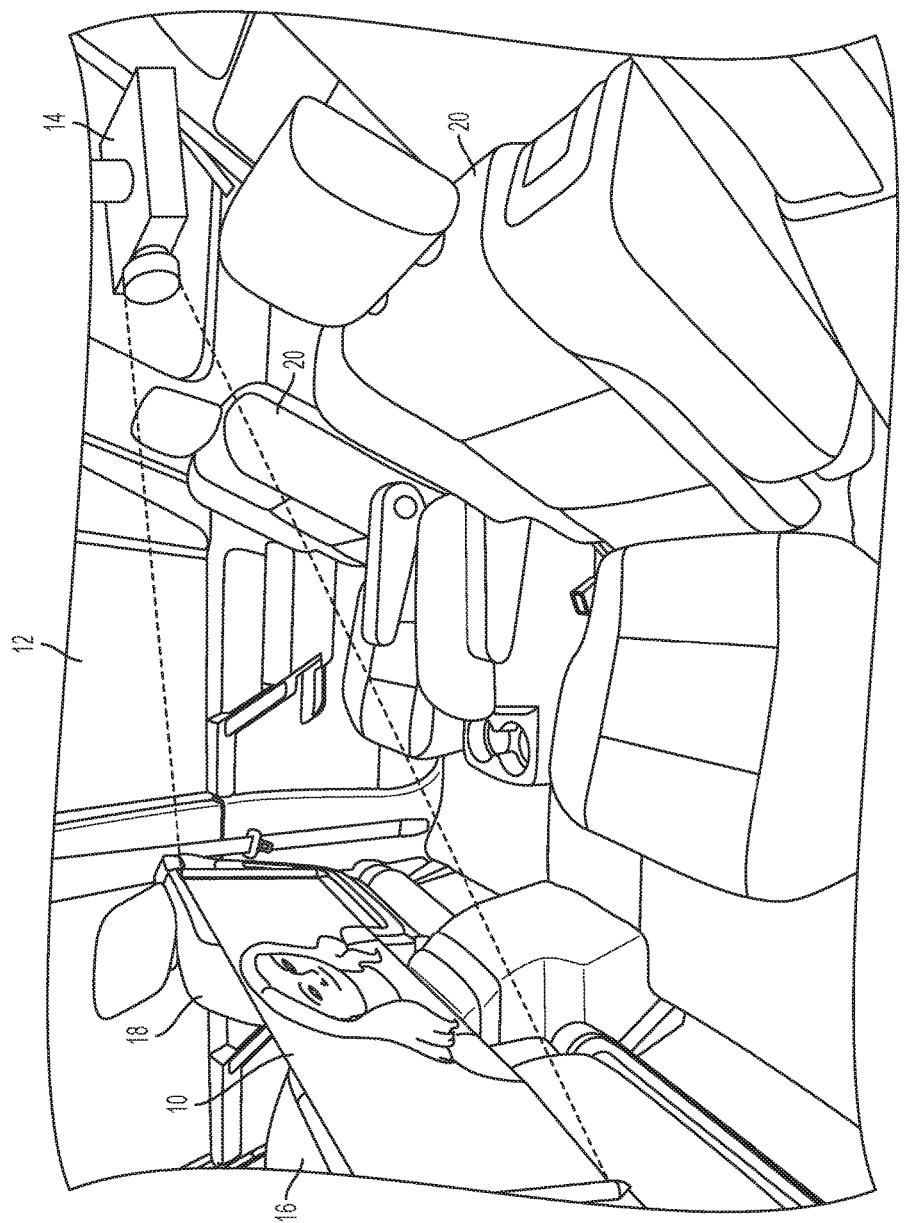
FIG. 2 is a perspective view of a projector using the exemplary retractable screen system of FIG. 1.

FIGS. 1 and 2 show a retractable screen system 10 for a vehicle interior 12. The screen system 10 is situated in the vehicle interior 12 such that it can receive and display the projected video image output of a projector 14 also installed in the interior 12. As shown, the screen system 10 may be installed on the backsides of the backrests for both a vehicle operator seat 16 and passenger seat 18. This allows for viewing from passengers sitting in the $2^{nd}$ row 20. However, the screen system 10 may also be installed in a variety of locations so as, for example, to allow for viewing by a passenger sitting in the $3^{rd}$ row or for tailgate viewing. Further, as a non-limiting example, the projector 14 may be one of a miniature Light Emitting Diode (LED) projection system, a miniature Digital Light Processor (DLP) projection system, and a laser-based projection system. Other projectors may be used, as appropriate.

Figure 3:
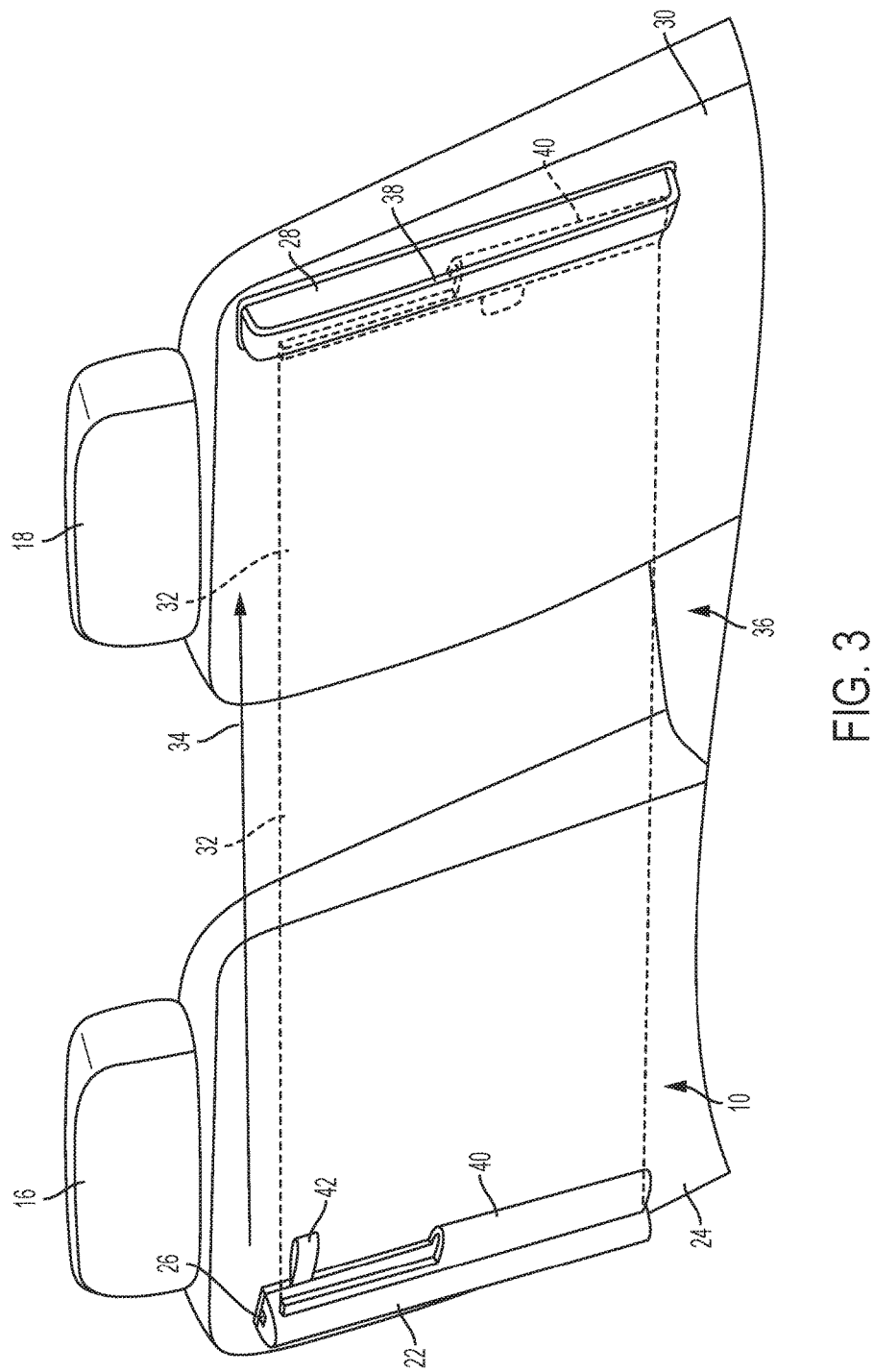
FIG. 3 is a perspective view of an application of an exemplary retractable screen system.
Figure 4:
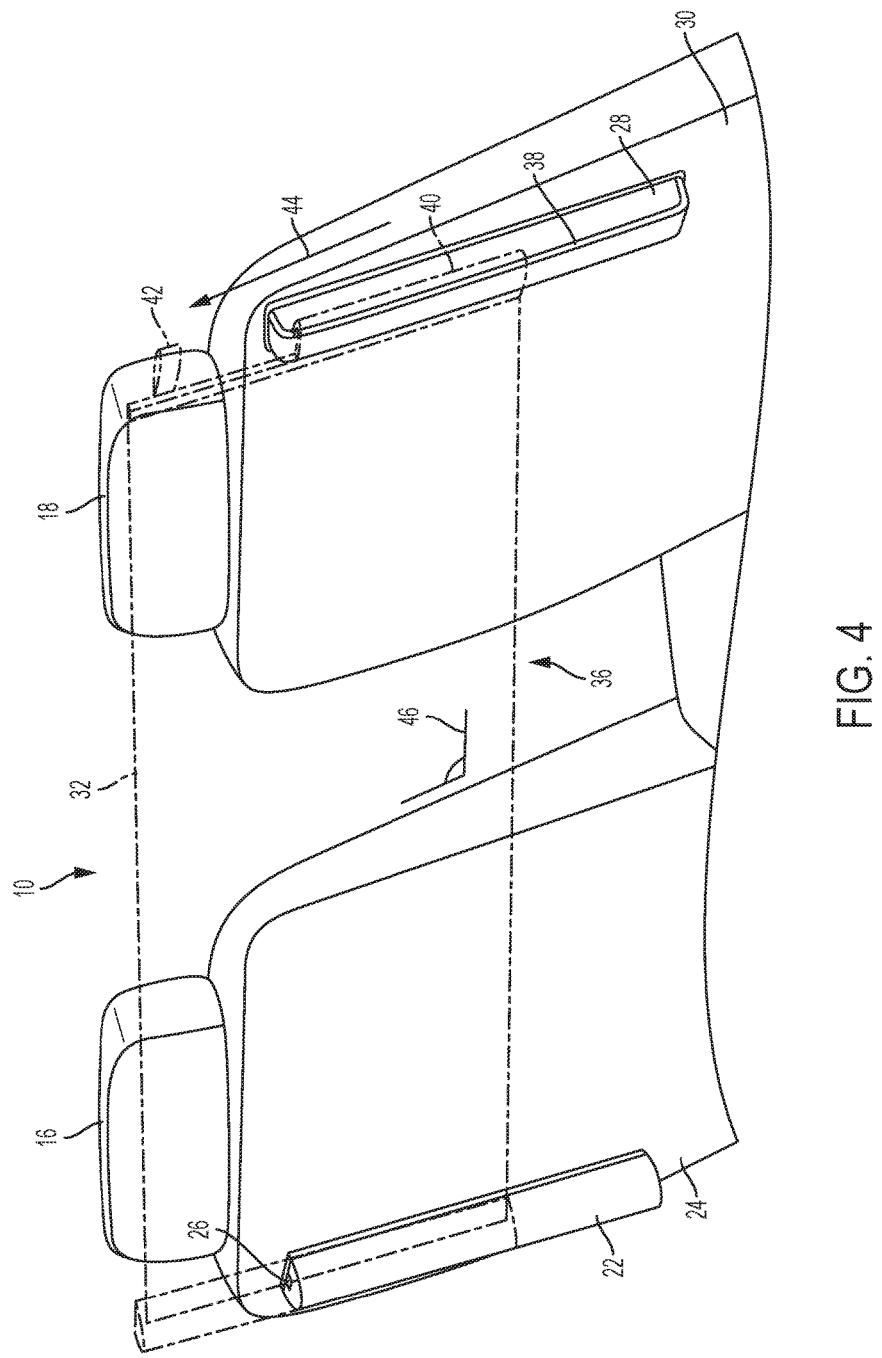
FIG. 4 is a perspective view of another application of the exemplary retractable screen system of FIG. 3.

As shown in FIGS. 3 and 4, the screen system 10 includes a retracting module 22 mounted to the backside of the backrest 24 of operator seat 16 via an attachment rail 26. Rail 26 may moreover be secured to backrest 24 via numerous screws or bolts or any other generally applicable joining mechanisms. The system 10 further includes a retaining device 28 such as, for example, an attachment bar which is mounted to the backside of the backrest 30 of passenger seat 18 via screws or bolts or any other generally applicable joining mechanisms. It should be understood that other embodiments of system 10 may incorporate one or more retaining devices 28 that are clips, loops, or orifices drilled into the backside of backrest 30.

A viewing screen 32 is stored within retracting module 22 and is typically formed from a flexible material suitable for displaying a projected video output of projector 14. While within module 22, screen 32 may, for example, he wound into a roll shape around a winding shaft located centrally within housing (not shown). This winding shall allows screen 32 to deploy from the retracting module 22 in a lateral direction 34 and across a gap 36 interposed between the operator seat 16 and passenger seat 18. Additionally, attachment bar 28 includes a ridge 38 on the side opposite the one that faces the retracting module 22. As a result, when screen 32 is fully deployed from module 22, screen 32 can releasably attached to ridge 38 via an attachment clip 40. As such, the U-shape of clip 40 clasps around the elongated body of ridge 38. This attachment establishes a viewing surface across the body of screen 32 which can display the projected video output of projector 14. An elongated rod may also be sewn onto the deployable end of screen 32 to ensure the screen 32 remains flat and able to adequately display the projected video output.

The deployment projecting end of screen 32 may also include a pull strap 42 to facilitate (make easier) lateral deployment of screen 32 while in module 22. In addition, when screen 32 is fully deployed and attached to bar 28, it creates a barrier across gap 36 that can block objects from traveling between the rear and front of the vehicle interior 12 and vice versa. It has also been envisioned that screen 32 may be a flexible OLED screen capable of displaying its own outwardly projected video output (previously known in the art). As such, in this embodiment, screen system 10 will not need to depend upon projector 14.

As can be understood by referencing FIG. 4, the attachment rail 26 incorporates a generally known elongated I-beam shape which interlocks with an elongated recess trench that spans the length of the underside of module 22 (the side which faces backrest 24 when system 10 is properly installed). This interlocking configuration enables module 22 to slide forwards and backwards along the length of rail 26 (until an end of module 22 meets with a stop at some location along the rail body). As a result, when screen system 10 is properly installed, module 22 can move in relation to an axis 44 which, for the most part, runs vertically along the backrest 24 (i.e., from the bottom to top of the back rest). Thus, the module 22 is ultimately mounted within the vehicle interior 16 in a substantially vertical manner subject to the reclined angle 46 of the backrest 24 (e.g., 105 degrees). As can be seen, module 22 can be shifted in such a way that attachment clip 40 may clasp onto different segments of ridge 38. Attachment clip 40 may also be adapted to clasp onto ridge 38 when the operator seat 16 is at a different reclined angle 46 than that of passenger seat 18.

Figure 5:
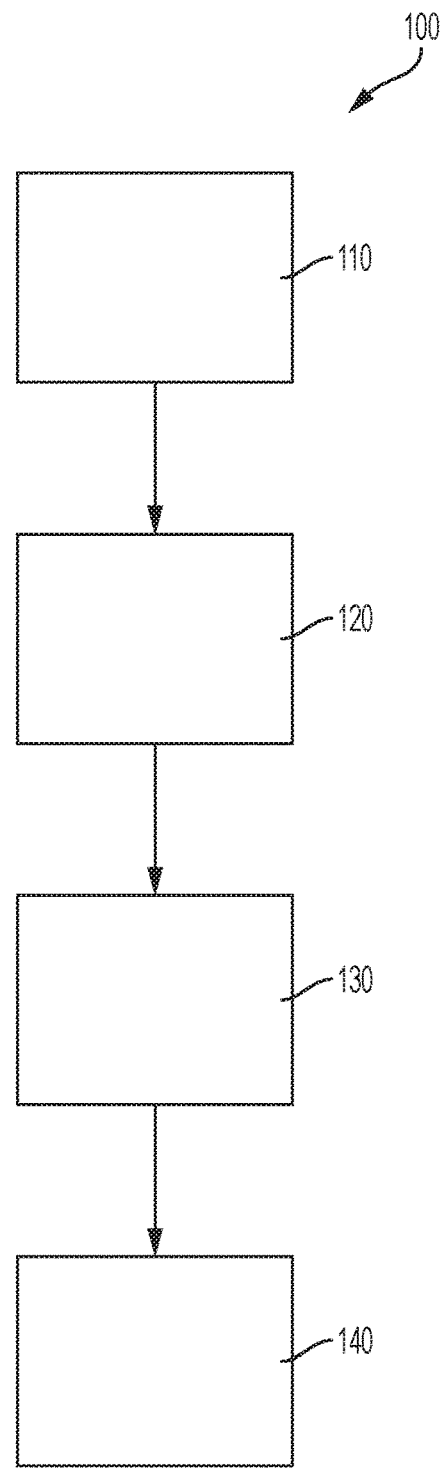
FIG. 5 is a flow chart of a method of installing an exemplary retractable screen system.

Turning now to FIG. 5, there is shown a method 100 of installing screen system 10. In step 110, a person installing system 10 mounts retracting module 22 to the backside of operator seat backrest 24, which may be done using screw or bolts, or any other applicable joining mechanism. In step 120, the person mounts attachment bar 28 to the backside of passenger seat backrest 24, which may also be done using screw or bolts, or any other applicable joining mechanism. In step 130, the person should ensure that no objects would block screen 32 while laterally deploying from the retracting module 22. In step 140, the person should ensure no objects would block attachment clip 40 from being able to releasably attach to ridge 38 and that a viewing surface adapted to display a projected video output can be properly established.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A retractable screen system for a vehicle interior, the system comprising:
   a retracting module mounted on a first surface of the vehicle interior;
   a retaining device mounted on a second surface of the vehicle interior; and
   a flexible screen configured to deploy from the retracting module in a lateral direction and releasably attach to the retaining device so as to establish a viewing surface adapted to display a projected video output;
   wherein the first surface of the vehicle interior is the backside of the backrest of a first vehicle seat; and
   wherein the second surface of the vehicle interior is the backside of the backrest of a second vehicle seat.

2. The retractable screen system of claim 1, wherein the retaining device is an attachment bar comprising a ridge.

3. The retractable screen system of claim 2, wherein the flexible screen further comprises an attachment clip adapted to releasably attach to a portion of the attachment bar ridge so as to releasably attach the flexible screen to the attachment bar.

4. The retractable screen system of claim 3, wherein the retracting module is mounted to the first surface via an adjustment rail, the adjustment rail configured to enable the retracting module to move in relation to a substantially vertical axis.

5. The retractable screen system of claim 1, wherein the flexible screen further comprises a pull strap to facilitate deployment from the retracting module in the lateral direction.

6. A method of installing a retractable screen system for a vehicle interior, the method comprising:
   mounting a retracting module to a first surface of the vehicle interior;
   mounting a retaining device to a second surface of the vehicle interior;
   allowing a flexible screen to deploy from the retracting module in a lateral direction; and
   allowing the flexible screen to releasably attach to the retaining device so as to establish a viewing surface adapted to display a projected video output
   wherein the first surface of the vehicle interior is the backside of the backrest of a first vehicle seat; and
   wherein the second surface of the vehicle interior is the backside of the backrest of a second vehicle seat.

7. The method of claim 6, wherein the retaining device is an attachment bar comprising a ridge.

8. The method of claim 7, wherein the flexible screen further comprises an attachment clip adapted to releasably attach to a portion of the attachment bar ridge so as to releasably attach the flexible screen to the attachment bar.

9. The method of claim 6, further comprising:
   wherein the retracting module is mounted to the first surface via an adjustment rail; and
   allowing the retracting module to move in relation to a substantially vertical axis via the adjustment rail.

10. The method of claim 6, wherein the flexible screen further comprises a pull strap to facilitate deployment from the retracting module in the lateral direction.

* * * * *